United States Patent
Wright et al.

(10) Patent No.: US 6,512,749 B1
(45) Date of Patent: Jan. 28, 2003

(54) DOWNLINK TRANSMISSION AND RECEPTION TECHNIQUES FOR A PROCESSING COMMUNICATION SATELLITE

(75) Inventors: David A. Wright, Solana Beach, CA (US); Stuart T. Linsky, San Pedro, CA (US); Donald C. Wilcoxson, Fort Wayne, IN (US); Eldad Perahia, Hermosa Beach, CA (US); Gregory S. Caso, Hermosa Beach, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/408,041

(22) Filed: Sep. 29, 1999

(51) Int. Cl.[7] .............................................. H04B 7/185
(52) U.S. Cl. ...................... 370/316; 370/318; 370/319; 370/321; 370/395.1; 455/427; 455/12.1; 455/13.4
(58) Field of Search ................................. 370/315, 316, 370/318, 319, 321, 337, 347, 442; 375/243, 246, 253, 265; 455/427, 12.1, 13.4

(56) References Cited

U.S. PATENT DOCUMENTS 5,600,629 A * 2/1997 Van Daele et al. ......... 370/349
6,157,642 A * 12/2000 Sturza et al. ................ 370/389
6,366,776 B1 * 4/2002 Wright et al. ............... 455/427
6,430,394 B1 * 8/2002 Boyden ..................... 455/13.4

* cited by examiner

Primary Examiner—Edward F. Urban
Assistant Examiner—Temica M. Davis
(74) Attorney, Agent, or Firm—McAndrews, Held & Malloy, Ltd.

(57) ABSTRACT

Communication satellite downlink transmitting and reception techniques includes circuitry which groups a predetermined number of data cells with a predetermined error correction code to generate frame bodies. The circuitry also groups the frame bodies with header symbols and trailer symbols to generate data frames. One or more modulators enable the placement of the modulated data frames into a plurality of frequency bands having a predetermined frequency range and a predetermined transmission rate. One or more antennas transmit the modulated data frames over one or more beams with different forms of polarization to other antennas. A demodulator is connected to demodulate the radio carrier signals and the beams into data frames from a plurality of frequency bands. Decoders are connected to decode the frame bodies with header symbols and with trailer symbols from the data frames and to decode four data cells as a group by using a predetermined error correction code.

128 Claims, 9 Drawing Sheets

DOWNLINK TRANSMISSION AND RECEPTION TECHNIQUES FOR A PROCESSING COMMUNICATION SATELLITE

BACKGROUND OF THE INVENTION

This invention relates to a processing communication satellites and more specifically relates to downlink reception and transmission techniques for such satellites.

A multibeam processing satellite system requires a comprehensive and consistent approach to its transmission system, including both its uplink and its downlink. Since the uplink and downlink transmission systems are decoupled by the processing (by demodulation, decoding, and switching) on the satellite, these two parts may be defined separately. The downlink transmission system definition must include all aspects relating to the spatial, polarization, spectral, and temporal attributes and, in particular, methods of multiplexing to permit many users to be concurrently serviced by the downlink. Additionally, various data handling issues, including error control and protocol aspects relating to the way that transmission data units are organized must be defined.

BRIEF SUMMARY OF THE INVENTION

A preferred form of the present invention is useful in a processing satellite communication system for generating and transmitting data in an available spectrum of frequencies suitable for use by a downlink transmitting system of a processing satellite. In such a system, a terminal is connected to receive data cells for transmission. First and second frame type signals are generated, preferably by a scheduler. A predetermined number of the data cells is grouped with a pre-determined error correction code to generate frame bodies. A first type of frame bodies are generated in response to the first frame type signal and a second type of frame bodies are generated in response to the second frame type signal, preferably by one or more error control encoders and an interleaver. The frame bodies are grouped with the header symbols and with trailer symbols to generate data frames comprising a predetermined number of symbols. The grouping is preferably done by a frame organizer. The data frames are modulated by a predetermined form of modulation to enable placement of the modulated data frames into a plurality of frequency bands having a predetermined frequency range and having a predetermined transmission rate definable in megasymbols per second. The modulating is preferably done by one or more modulators. The modulated data frames are transmitted over one or more beams with a predetermined form of polarization, preferably by a radio transmitter. Power is reduced in response to the second frame type signal.

Another preferred form of the invention is suitable for use in a processing satellite communicating system for receiving and processing radio carrier signals in an available spectrum of frequencies transmittable by a processing satellite in a downlink. In this embodiment, one or more beams of the radio carrier signals having one or more forms of polarization are received, preferably by an antenna system. The radio carrier signals are separated into a plurality of frequency bands having a predetermined frequency range and having a predetermined transmission rate definable in megasymbols per second. The frequency bands are demodulated into data frames comprising a frame body and a header including a frame type. The demodulating preferably is performed by demodulator circuits. The frame type is decoded into a first frame type and a second frame type and the frame bodies are decoded into a pre-determined number of data cells in response to the first frame type. The decoding preferably is accomplished by decoder circuitry. The decoded data cells are transmitted for further processing, preferably along a data bus. A first number of the data cells is transmitted in response to the first frame type, and a second number of data cells less than the first number is transmitted in response to the second frame type.

Still another preferred form of the invention involves generating radio waves for use in the down link of a processing communication satellite. Radio waves are generated in one or more beams having one or more forms of polarization and a predetermined form of modulation. A first group of the beams is limited to a single form of polarization.

The radio waves also are generated to represent a plurality of frequency bands having a predetermined frequency range and having a predetermined transmission rate definable in megasymbols per second. The ratio of the predetermined frequency range to the predetermined transmission rate is in the range of 1.2 to 1.3. The radio waves also are generated to represent serial TDM streams of data frames, and at least some of the streams are used with the first group of beams. The data frames comprise a predetermined number of symbols defining frame bodies with trailer symbols and with header symbols defining:

(1) frame marker symbols for delineating the data frames and for resolving modulation ambiguity, (2) non-repeating frame number symbols indicating frame numbers of the data frames which do not repeat over the expected life of said satellite, and (3) frame type symbols indicating different types of the data frames.

The frame bodies comprise a plurality of blocks formed by a plurality of cells which are encoded by an outer code to yield a coded block. One or more of these coded blocks are entered into a rectangular interleaver array. The interleaver array's contents are accessed in orthogonal order to that in which it was entered and encoded a second time by an inner code and partitioned into two separate independently decodable quadrature components modulated by square-root raised cosine pulse shaping on quaternary phase shift keying. The radio waves also are generated to represent a predetermined number of data cells with a predetermined error correction code grouped within the data frames.

The foregoing techniques offer a number of advantages. For example, the techniques permit extensive frequency reuse, as well as a single access downlink which reduces intermodulation effects. The frequency placement and spectral shaping aspects of the preferred form of the invention permit efficient usage of downlink spectrum. The invention also enables null cell insertion to round out frames, thereby permitting rate decoupling. Traffic cells can be released at the earliest opportunity without explicit downlink scheduling, and any traffic rate from essentially zero up to the maximum (i.e., the downlink symbol rate) can be directed to a specific user terminal. The downlink symbol rate used in the preferred embodiment provides a well-defined reference frequency to be used as a stable reference by all ground terminals. The preferred embodiment also provides a built in reference for ambiguity resolution of the received quaternary phase downlink signals. The preferred embodiment also provides a built-in reference for precise time-of-arrival measurement of downlink frames. The preferred embodiment also provides a non-repeating downlink frame number (over the life of the system) for simple derivation of uplink synchronization. The preferred embodiment also provides for gating off of the downlink transmission when an empty frame (i.e., all null cells) would be created otherwise, thereby reducing the draw on satellite bus power. The error control methods provided by the preferred embodiment enable highly efficient usage of downlink power. The preferred embodiment enables two levels of transmission (alternatively up to eight) to accommodate adaptation to rain events and to increase usable downlink capacity. The preferred embodiment provides for identically sized frames for heavy, light (alternatively up to 8 different inner coding rates) and empty frames for simple downlink synchronization. The invention is compatible with ATM (asynchronous transfer mode) standards and provides virtually all supervisory functions via standard ATM cells. The preferred embodiment is well adapted to highly efficient DAMA methods for low duty cycle burst usage such as "web browsing."

DETAILED DESCRIPTION OF THE INVENTION

Figure 1:
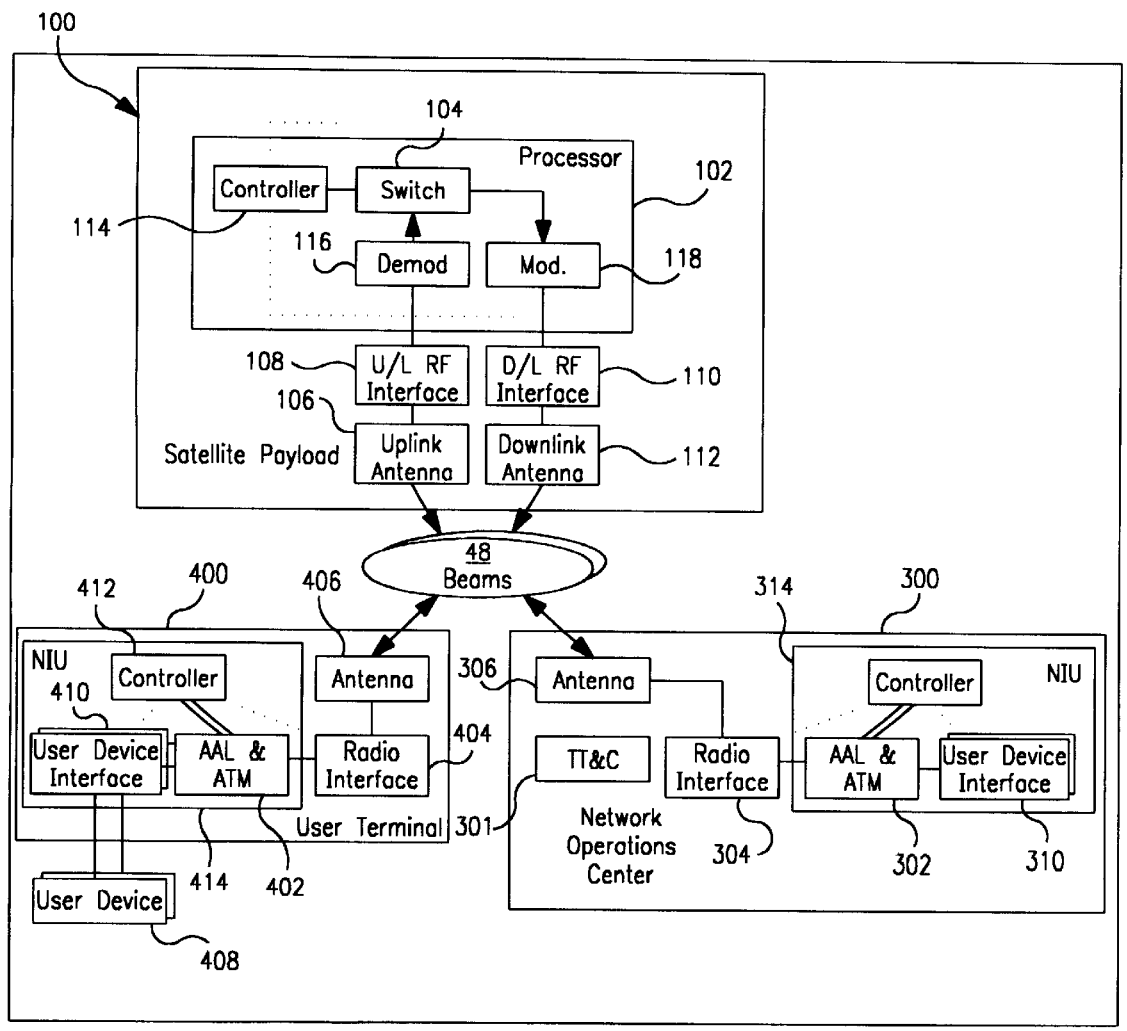
FIG. 1 is a schematic block diagram of a preferred form of transmission and reception apparatus made in accordance with the present invention.

Referring to FIG. 1, a preferred form of the invention includes one or more satellites, such as satellite 100, in Geo-orbit. Satellite 100 contains a processor 102 that performs a cell switching function. The processor's controller 114 configures a cell switch 104 based on commands received from one or more ground-based Network Operations Centers (NOCs) such as NOC 300. The NOC 300 provides ATM switch management functionality, including call admission control and the signaling with one or more User Earth Terminals (UETs), such as UET 400, required to establish an ATM switched virtual circuit.

The payload of satellite 100 is controlled by NOC 300 which may control multiple satellites.

ATM cells transmit user data through the system, from source UET 400 to a destination UET (not shown). This is the primary system flow, starting from the AAL/ATM component 402 within the UET 400; flowing through the UET's RF interface 404 and antenna 406; through the satellite payload's uplink antenna and RF interface 108; switched through the processor 102 through the payload's downlink RF interface 110 and antenna 112; and finally through the destination UET's antenna and RT interface to the destination UET's ATM/AAL component (not shown).

User data is transferred between the system and a user device 408 via the "External User Data" flow. This data flow, which is in a format unique to the user device, yet based on industry standards, is converted into a UET internal format (e.g., a PCI bus) by a user device interface 410 and transferred to the ATM/AAL component 402 where it enters the ATM cell flow. In addition to the transfer of user data, ATM cells are used to transport signaling. This data flow includes the signaling of messages between the controllers located in the NOC 300, payload processor 102 and UET 400. ATM cells are used in this stream for two reasons. First, the satellite payload's controller can exchange messages with any UET and NOC by simply sending an ATM cell with the correct address to the cell switch 104. The controller-switch interface is then just like any other switch port. Second, the multiple access scheme in the UET and NOC must already address the insertion of ATM cells into the transmission subsystem to carry user data. Inserting signaling messages into this data stream is made simpler by using the same ATM cell format.

Control and management signals are provided internal to each component: the terminal controller unit 412 in the UET 400 must signal the RF interface 404 to tune to a particular frequency, for example. The payload controller 114 must collect traffic statistics from the demodulators; telemetry data is collected within the NOC's TT&C 301 and transferred to the satellite 100; the payload controller 114 must configure the switch 104 to route virtual circuits; timing and frequency signals must be passed to many payload components, etc.

UET 400 provides the capability to connect user devices to the network. The term "user device" refers to any communication equipment that conforms to industry standard interfaces, including PCs, telephones, set-top boxes, ATM switches, IP routers, UNIX workstations, etc.

User devices communicate with other user devices, attached to other UETs through the use of ATM switched virtual circuits (VCs). Individual VCs are established and maintained through signaling messages exchanged between NOC 300 and the UET 400. A single UET can support multiple VCs and user devices.

The user device 408 may or may not support the ATM protocols. For non-ATM user devices, the UET 400 encapsulates the user data stream in ATM cells for transmission across the network. The destination UET then recovers the user data stream which is passed to the destination user device.

User device 408 represents a variety of current consumer electronics devices, including personal computers, set-top boxes, interactive game players, and Web-TV devices. These devices interface with the Network Interface Unit (NIU) 414 via industry standard interfaces or "ports" including the RJ-11 telephone jack; PC buses such as EISA, PCI and SCSI; LAN networks such as Ethernet and IEEE 802.3; and video and audio ports.

The external interface components of the NIU 414 provides the mechanical and electrical interface to the user device. Functionally, a unique line interface exists for each type of interface (RJ-11,PCI, 802.3). Physically, a single NIU may include several line interfaces. For example, an NIU may be packaged as a "plug-in" card for a PCI bus and provide RJ-11 and IEEE 802.3 line interfaces.

Component 402 within the NIU 414 is responsible for converting a stream of bits produced by the user device interface into ATM cells. In order to produce ATM cells, this component implements various ATM Adaption Layer (AAL) protocols. It is also responsible for inserting messages produced by the controller into the ATM "stream" and removing ATM cells received from the network destined for the controller.

The controller 412 provides network specific signaling functions. This includes subscriber registration, the establishment connections between the UET 400 and the network and network management functions.

The radio interface 404 of the user terminal 400 provides forward error correction (FEC) coding, interleaving and modulation for data being transmitted to the network and demodulation, de-interleaving and decoding for data received from the network. This includes the framing of ATM cells produced by the protocol adaptation component into TDMA channel slots on the uplink.

The antenna 406 is responsible for radiating energy toward the satellite 100 and collecting energy from the satellite's downlink.

UET 400 can assume many different physical forms. To support a consumer grade, Class Z terminal, a plug-in PC card may contain the NIU 414 and portions of the radio interface 404, with a cable connecting the card to an outdoor device housing the remainder of the Radio Interface 404 and the antenna 406.

To support an Internet Service Provider's gateway, UET 400 may consist of one or more 10baseT user device interface cards (each connected to a port on a router), a single board computer to serve as the controller 412, an AAL/ATM card 402 to provide ATM functions, and a separate card to provide the radio interface 404. These cards could all reside in VME chassis and be mounted in the same rack as the router and other ISP equipment.

Similar to the PC plug-in card described above, the UET 400 can be integrated into a television's set-top box or game player, with a cable running outside to the antenna.

In each of these examples, the architecture of the UET remains unchanged. Each contains an NIU 414 that interfaces with one or more user devices, a radio interface 404 and an antenna 406. This same architectural philosophy is extended to the network operations center 300. The NOC 300 also contains an NIU 314 where the very same functions present in the NIU 414 are performed. The corresponding devices in NOC 300 bear the same numbers as in UET 400, except that they are in the 300 series, rather than the 400 series.

The central role of the satellite 100 payload is to switch ATM cells from source to destination. In order to switch ATM cells, the source bit stream must be recovered (demodulated and decoded), partitioned into cells, and routed through the switch 104. These functions constitute a "processed payload" in common industry parlance and are provided by the processor 102 in the system architecture.

The processor contains the following components:

A demodulator 116 provides an A/D converter, channelizer and demodulator for each band. The demodulator recovers the data from the noisy received uplink bursts and presents this as undecoded blocks to a following error control decoder. The demodulator supports two coding rates: a light code for normal service and a heavy code to compensate for rain loss. Each uplink channel is designated as either heavily coded or lightly coded as is described in detail in a related patent application Ser. No. 09/408,331, "Uplink Transmission and Reception Techniques for a Processing Commuication Satellite", David A. Wright, et al., filed concurrently herewith and which is incorporated herein by reference.

The switch 102 performs decoding, ATM cell switching and encoding. The switch is designed to support up to 128 incoming and up to 128 outgoing ports, each operating at approximately 100 Mbps of unencoded data. The 128 ports are representatively divided between 96 to support the uplink and downlink beams (2 ports per beam), 2 ports connected to each crosslink (2 East and 2 West), 12 ports connect to multicast modules that provide cell duplication and 2 ports connected to the controller. The representative allocation leaves 24 spare ports.

The controller 114 provides network specific signaling functions. This includes the establishment of virtual circuits through the ATM switch and network management functions.

A modulator 118 performs coding, modulation and signal shaping. Mirroring the demodulator, the modulator supports two coding rates: heavy and light. Each downlink frame is of either heavy or light type. Cells received from the switch are designated as either heavy or light. Light cells may only be borne in light frames. Heavy frames may bear either type of cell.

Uplink antenna 106 receives 48 spot beams across 1,000 MHz of spectrum in the 30 GHz band using a 1-in-4 frequency reuse pattern.

Uplink RF interface 108, comprises a bandpass filter to select a frequency band assigned to one of 48 beams. For each band, the uplink RF interface 108 provides a low noise amplifier, down-converter and an automatic level control function.

Downlink RF interface 110 comprises an upconverter, traveling wave tube amplifier (TWTA), and waveguide. Each downlink beam has one of two types of TWTAs: a lower power version for gateway beams and a higher power one for standard user terminals, each feeding one 125 MHz band.

Downlink Antenna 112 transmits 48 spot beams across 1,000 MHz of spectrum in the 20 GHz band, using a 1-in-4 frequency reuse pattern.

The Network Operations Center (NOC) 300 serves as the "switch manager" for the satellite payload's cell switch. The NOC 300 controls the establishment of each ATM virtual circuit through an exchange of signaling messages with the source and destination UETs.

In its switch manager role, the NOC 300 performs a variety of functions, including: call establishment signaling; cell switch configuration; call admission control; user authentication; user service authorization; address resolution; routing; connection statistics collection; network congestion control; and priority access control.

The components within the NOC appearing in FIG. 1 are summarized below:

Antenna 306 is functionally the same as UET's antenna 406 with the additional capability to transmit and receive TT&C signals. The Ka-band maybe used for TT&C, or another band, requiring a different antenna, could be used. The largest version terminal (i.e, Class C) is used.

RF interface 304 is functionally the same as the UET's RF interface 404 with greater performance.

Network Interface Unit 314 is functionally the same as the UET's NIU 414, with greater performance.

Figure 2:
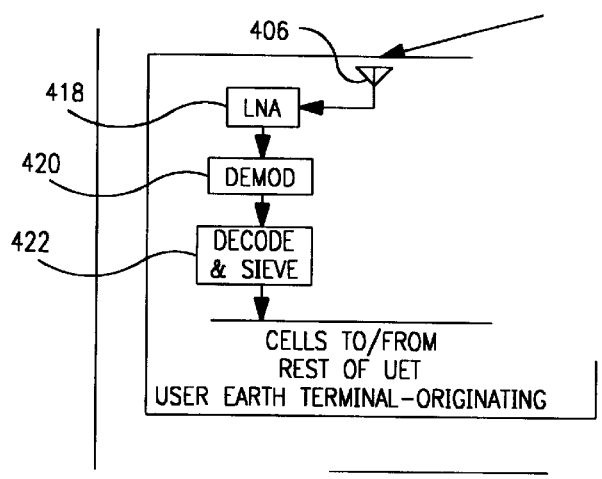
FIG. 2 is a schematic block diagram of a portion of the apparatus shown in FIG. 1.

As shown in FIG. 2, RF interface 404 comprises a low noise amplifier 418, a demodulator 420 and a decoder and seive circuit 422.

Figure 3:
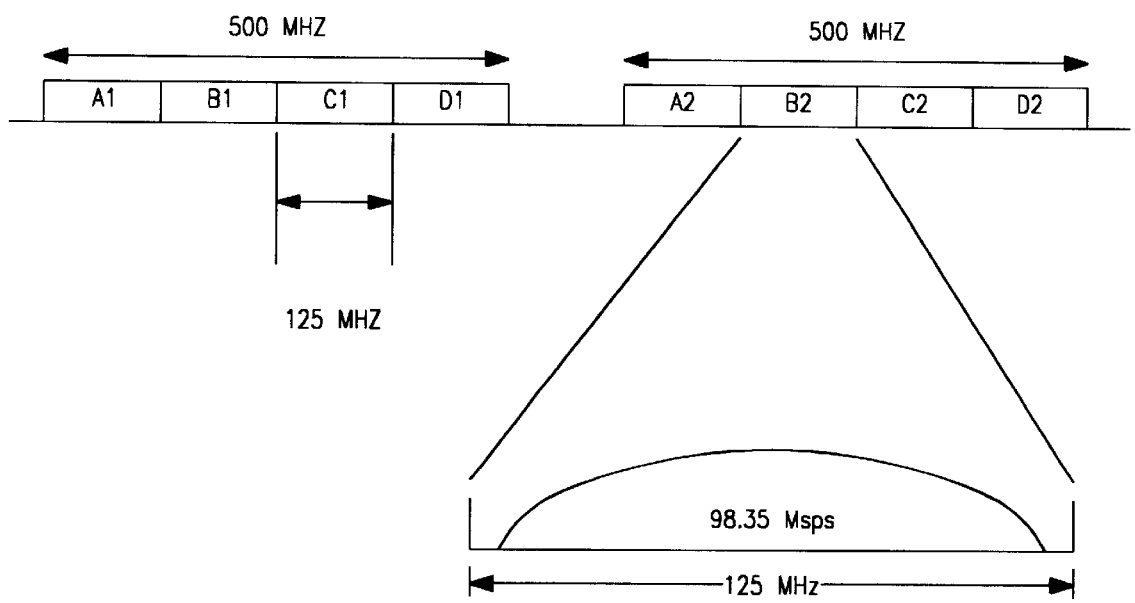
FIG. 3 is an illustration of a preferred form of downlink channelization made in accordance with the invention.
Figure 4:
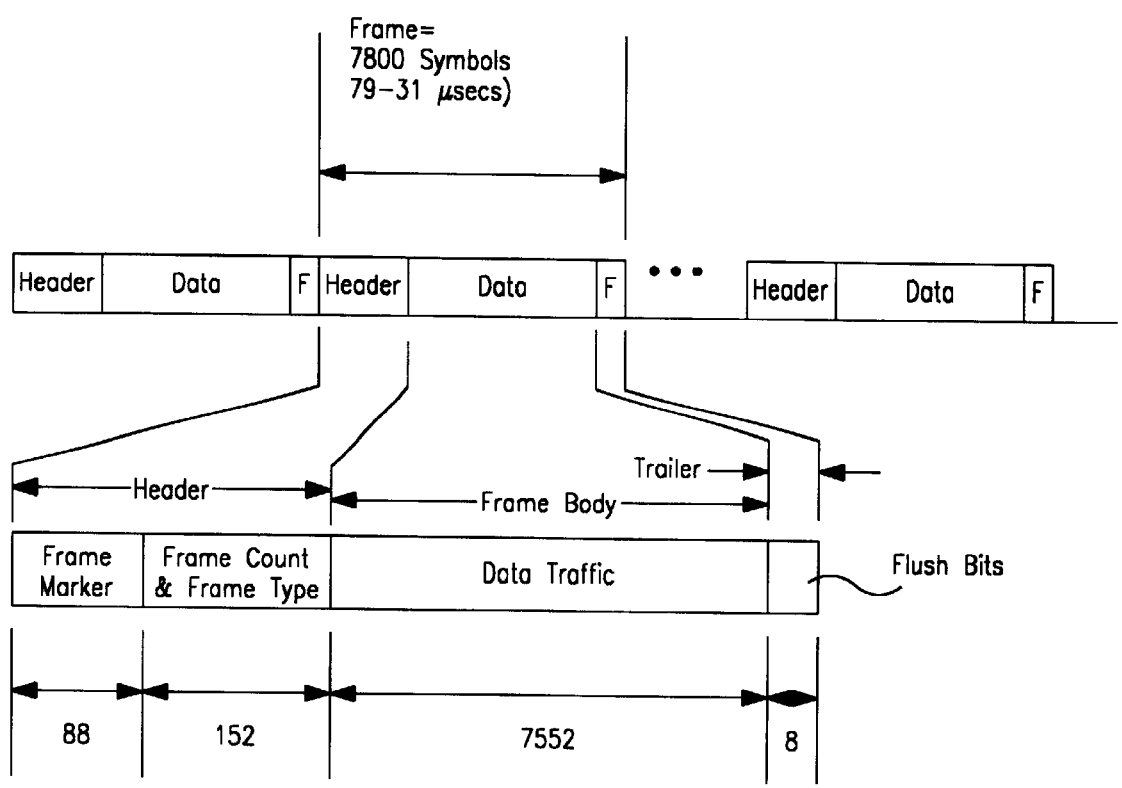
FIG. 4 is an illustration of a preferred form of downlink frame format in accordance with the invention.

The techniques and parameters used by the receiving portion of RF interface 404 are illustrated in FIGS. 3 and 4. The techniques detailed below achieve high system capacity multiple-access via a combination of spatial, frequency-division, and time-division approaches which efficiently use the regulatory bandwidth allocation for this service. The modulation techniques selected for uplink and downlink use are integrated with forward error correction coding techniques that minimize the required power to close the links given the Ka-band propagation conditions and hardware-driven system cost constraints.

One gigahertz of RF spectrum is available for use by the downlink of each satellite. The allocated spectrum in the Ka-band (30 GHz up and 20 GHz down) is divided into eight bands of 125 MHz each which are used in a cluster structure among the forty-eight beams formed by the satellite antennas 112. A four-frequency re-use strategy among the beam coverage areas provides 1 GHz times a quarter of 48 or 12 GHz of RF bandwidth for both uplink and downlink for a given satellite. The reuse includes specific frequency bands with a four cell cluster configuration on each of two polarizations. Each satellite uses circular polarization, either right hand, left hand or both.

Single carrier access of each downlink band is provided with a 98.35 megasymbol per second carrier. The ratio of the frequency range of the bands in cycles per second divided by the transmission rate in symbols per second is in the range of 1.2 to 1.3. The preferred ratio is 125 MHz/98.35 M symbols per second=1.271.

Staggered filtered quaternary phase shift keying (QPSK) modulation (alternatively, GMSK, or other modulation techniques) is used.

The downlink stream is divided into frames each of 7800 symbols, regardless of the coding type, whether a data frame is empty or not. Essential overhead is provided within the frames including:

a frame marker sequence for delineation of frames within the serial downlink stream and for resolution of QPSK ambiguity;

a non-repeating frame number, for use in uplink synchronization;

a robust indicator of the inner code being used in the frame; and flush bits resulting from tailing off the inner encoder (e.g., tailing off of the process of generating the inner code).

The non-repeating frame number does not repeat over the expected life of satellite 100.

The payload data comprises twelve or twenty-four cells as the inner code rate is 3/8 or 6/8, respectively (alternatively, k*4 cells as the inner code rate is k/8, with k an integer less than or equal to 8).

Frames with no payload (essential overhead only) are provided to permit power gating of the downlink.

All payload data is protected by a concatenated error control method comprising:

a (236, 212) Reed-Solomon code (being a shortened (255, 231) code) with each 236 byte code block bearing four ATM cells;

a rate 6/8 "light" inner code or a rate 3/8 "heavy" inner code with the codes being convolutional in each case, and additionally, other inner codes, being of rate k/8, with k being an integer less than or equal to 8.

Three or six outer code blocks are interleaved, as the coding is heavy or light, respectively (alternatively, other interleaving consistent with the code rate (i.e., k of k/8)). The resultant interleaved structure is a bit array of dimension (236×64) for all values of k for a total of 15104 bits which map to 7552 quantenary symbols.

The inner coded stream is partitioned onto two separate, independently decidable, quadrature components.

ATM cells are used for conveyance of all downlink traffic both for users and for system management, including satellite position (ephemeris) information and status reports on user terminal's timing and error rate. Additional details about interleaving and providing identically-sized frames is described in U.S. application Ser. No. 09/169,875, entitled "Common Downlink Frame For Differing Coding Rates," filed Oct. 12, 1998 in the name of David A. Wright which is incorporated by reference, and which is assigned to the same assignee as this application.

As shown in FIG. 3, a 1 GHz spectrum of available frequencies is divided into two 500 MHz bands for the downlink transmission system. The first 500 MHz band is divided into 125 MHz bands A1, B1, C1 and D1. The second 500 MHz band is divided into 125 MHz bands A2, B2, C2 and D2.

Each of the 125 MHz bands serves a given area of antenna coverage (a beam) on a particular polarization and contains a single 98.35 megasymbol per second high speed serial single axis TDM stream.

As shown in FIG. 4, the time structure of the 98.35 megasymbol per second high speed serial single axis TDM stream is shown. This stream is organized into frames of 7800 symbols with each frame containing a body of 7552 symbols, a header of 240 symbols, and a trailer or flush bits of 8 symbols. The dimensions of FIG. 4 are in QPSK symbols (98.35 megasymbols per second). The frame body bears 4 times K ATM cells and consists of K code words (Reed-Solomon (236, 212)) where K=3 or 6. An inner code of rate K/8 expands the size of the frame body to 7552 symbols for all K. The 240 symbol header consists of an 88 symbol frame marker and a 152 symbol frame count and frame type.

The 88 symbol frame marker can be tracked at signal to noise ratios (s/n) which are lower than the (s/n) at which data traffic in the frame body of the data frames can be successfully decoded. The tracking of the frame marker is achieved by correlating the known pattern of the frame marker (i.e., 88 symbols which occur at a known time in each frame) with the pattern of the frame marker being tracked. The correlation is positive if 88 symbols are successfully decoded in the frame marker being tracked.

The frame type is more robust than the data traffic in the frame body because the frame type symbols indicating whether a data frame is heavily coded, lightly coded, or contains null code are essential for the correct operation of the decoders. The frame type symbols are made robust by including 32 symbols of redundant and error control coding. A 64,3 code (sometimes referred to as an 8 fold repetition of an 8, 3 code) is utilized in which 3 information bits are used with 64 bits of redundant and error control coding.

As used by satellite 100, the allocated spectrum is divided into eight bands of 125 MHz each. The bands are coupled in four sets of two for use in the four categories ("colors") of beams present in the geographical coverage pattern. These bands and their associated colors are set out in Table 1:

| Downlink Band Range, GHz | D/L Band ID (color) |
| --- | --- |
| 19.2625 ± 0.0625 (19.200 – 19.325) | A1 |
| 19.7625 ± 0.0625 (19.700 – 19.825) | A2 |
| 19.3875 ± 0.0625 (19.325 – 19.450) | B1 |
| 19.8875 ± 0.0625 (19.825 – 19.950) | B2 |
| 19.5125 ± 0.0625 (19.450 – 19.575) | C1 |
| 20.0125 ± 0.0625 (19.950 – 20.075) | C2 |
| 19.6375 ± 0.0625 (19.575 – 19.700) | D1 |
| 20.1375 ± 0.0625 (20.075 – 20.200) | D2 |

Satellite 100 uses circular polarization on both the uplink and the downlink. The polarization is right hand, left hand or both. All transmissions from and to a single satellite are co-polarized across the entire spectrum, with the opposite handedness being used for transmit and for receive. The concept of operations permits the option of placing a second satellite using the orthogonal polarization at the same longitude, with the same frequency coverage, and the same geographical coverage to double the frequency reuse.

Figure 5:
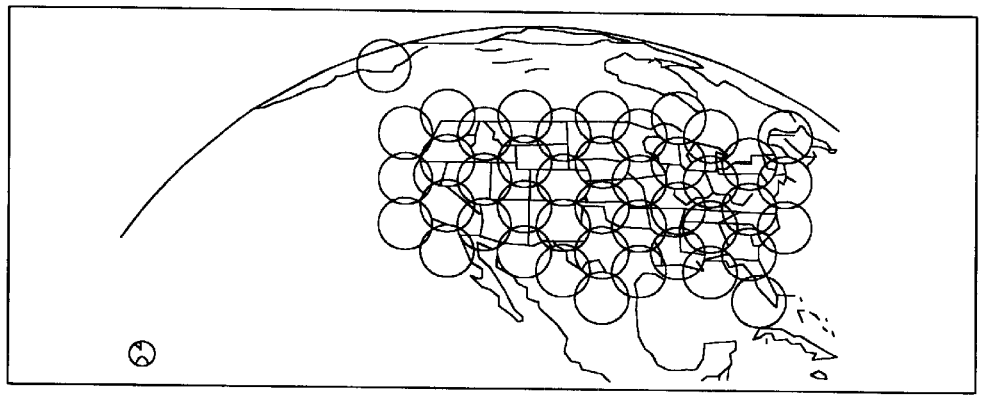
FIG. 5 is an illustration of an exemplary beam lay down pattern in accordance with the invention.

Satellite 100 uses multiple spot beams to permit high quality link performance via cellular beam coverage areas with higher gains and to obtain frequency re-use where spatial isolation among beams allows the same frequency band to be used for multiple areas. In a representative beam layout for the geographical coverage area of the contiguous, continental United States (CONUS), there are 48 beams with coverage as shown in FIG. 5.

Satellite 100 achieves high spectral efficiency by using each band of frequencies repeatedly across the geographical coverage area. In the representative beam layout illustrated in FIG. 5, there are four distinct classes of beams (i.e., A, B, C, and D for the downlink areas). Each class has twelve members for a forty-eight beam geographic coverage, and is referred to as a "color" with each beam in the color using the same pair of bands.

Figure 6:
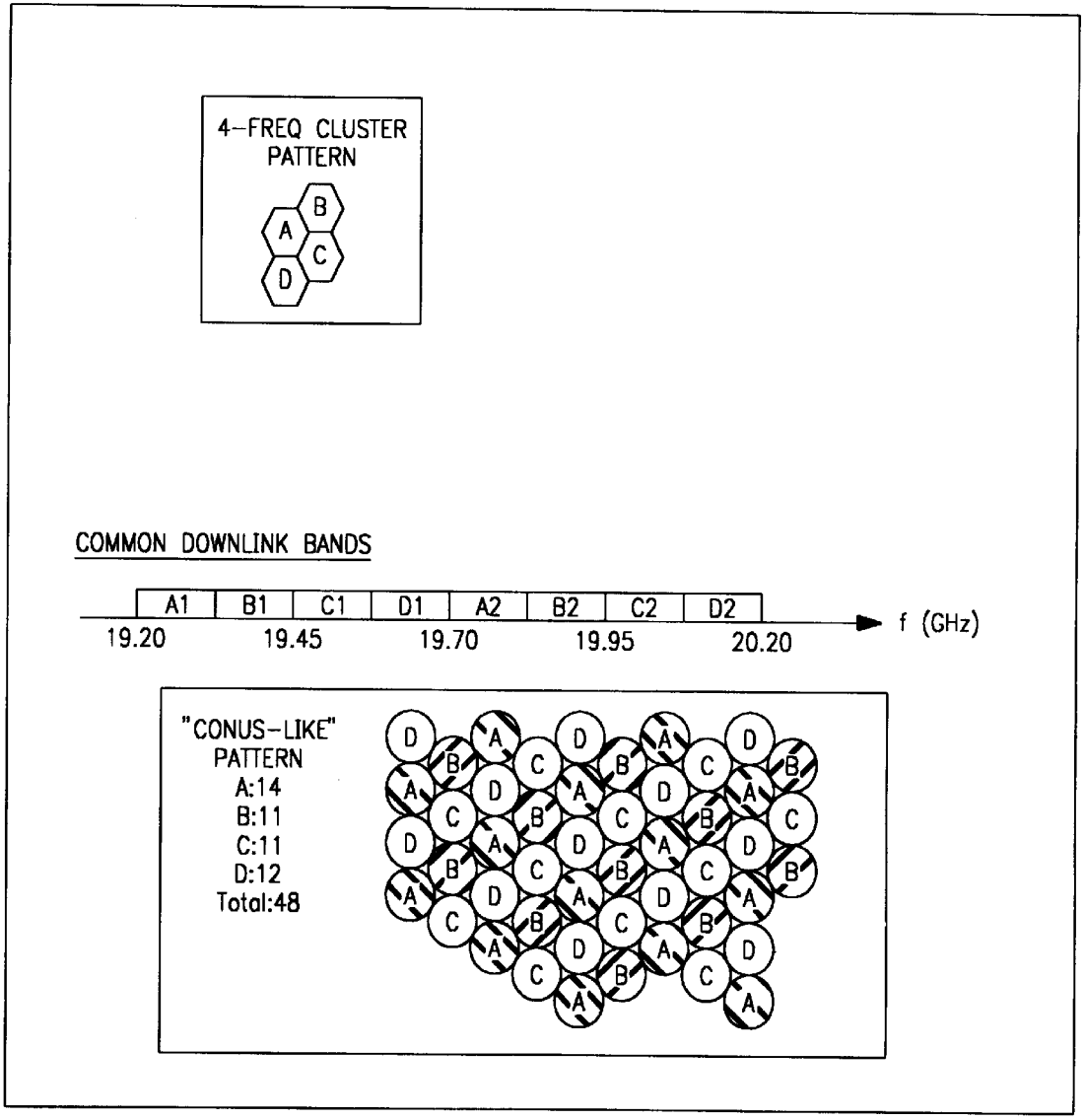
FIG. 6 illustrates exemplary multi-beam coverage patterns enabling frequency reuse in accordance with one form of the invention.

FIG. 6 shows how hexagonal beam tessellation using a cluster of four frequencies can be used to construct a 48-beam pattern. For symmetric overall patterns, all frequencies repeat equally, while for asymmetric patterns, there is an unequal distribution of the four frequencies which depends on the pattern's shape.

For a single satellite 100 with a symmetric coverage pattern (FIG. 6), each of the four pairs of uplink and downlink frequency bands is re-used 12 times in the 48-beam coverage area by spatial frequency re-use: that is, a total of 12.0 GHz of bandwidth is available at the satellite for both the uplink and the downlink. When a pair of satellites using circular polarization operates from the same geostationary orbital location into the same geographical area, polarization frequency reuse will double the re-use factor to 24.

Satellite 100 relies on a negligible probability of bit error subject to a discarded cell ratio of a few parts per million when a communication link is at the threshold of performance. This high integrity approach is realized by the use of powerful error control techniques.

A central consideration in the design of a Ka-band system is the need to provide a substantial link margin to accommodate the effects of rain, which become quite severe at these frequencies. This margin is attained in satellite 100 by applying a second level of error control. Since the additional margin is needed only part of the time, this second layer of coding is deployed adaptively, so that the additional bandwidth required to support it does not penalize UETs operating under clear sky conditions. Additional details about such adaptive coding is explained in U.S. application Ser. No. 09/163,775, filed Sep. 30, 1998 in the names of David A. Wright et al., entitled "Adaptive Coding Scheme For A Processing Communications Satellite" which is incorporated by reference and is assigned to the same assignee as the present application.

Each 212 byte (or octet) information block is adjoined with 24 bytes of parity to form a codeword in a (236,212) Reed-Solomon error correcting code. This code has the property that all patterns of 12 or fewer byte errors are correctable when the received version of the 236 bytes is subjected to decoding by a standard BCH decoding algorithm. As a side benefit, the decoding process almost always detects the presence of more than 12 errors with the result that such undecodable cases may be discarded rather than risk misdirection of the cells contained therein.

The design point for the outer code is based on a threshold byte error rate prior to decoding of 1.2%. For this input error rate, the probability that 12 or fewer errors are present in a block of 236 bytes may be shown to be about 7 parts per million, which is the threshold cell loss rate due to channel imperfections.

The link design calls for routine operation at one decibel above threshold, at which point the input error rate drops to about 0.24% and the concomitant probability of undecodability drops to less than 1 part per trillion. As noted above, the probability of decoding a block incorrectly is so small as to be negligible, even at threshold. The threshold described in the preceding paragraph typically occurs only under stressed conditions, such as heavy rain.

Inner coding is applied to the uplink and downlink for a UET 400 on an as-required basis. For lightly coded uplink traffic, no inner coding is applied. Lightly coded downlink traffic uses a rate 3/4 convolutional code. When required to mitigate unfavorable link conditions, a rate 1/2 inner code is used on the uplink and the downlink inner code is strengthened to rate 3/8. The reason for differing code rates is that, for a given rain rate, the amount of fading occurring in the 30 GHz uplink is greater than the degradation that occurs in the downlink. Note that the inner code is typically applied to both the uplink and the downlink traffic to and from a UET 400 concurrently and that the presence of severe fading is usually localized to a much smaller area than that covered by the satellite 100 beam.

The downlink inner code is a non-systematic, convolutional, rate 3/8 or 3/4 code for heavy and light, respectively, each with a constraint length of 7. This code is applied to three or six blocks (including the parity for the outer code) in each frame in the downlink after these blocks have been organized into a 236 by k*8 rectangular interleaving array where k=3 or 6 for heavy or light, respectively. The interleaver array is filled by rows (k*8 rows concurrently) with 236 byte blocks from the outer encoder. The array's contents are presented to the inner code encoder by columns from the array. After encoding, this expands to a total of 15,104 bits in a universal 64 by 236 data container plus 2 bytes used for tailing off the convolutional code. When decoded using the Viterbi Algorithm on soft decisions, this convolutional code produces output errors at an average bit error rate of 0.0015 (corresponding to a byte error rate of 1.2%) when the energy per component to noise ratio is at the threshold level.

A frame structure is imposed in both the uplink and the downlink for satellite 100. The downlink frame structure permits the separation of the heavily and the lightly coded traffic and forms part of the overall synchronization system that ensures the uplink bursts arrive at the satellite with a highly precise time placement. The uplink frame structure serves to define individual channel slots "chanslots" in each of the uplinking channels.

Figure 7:
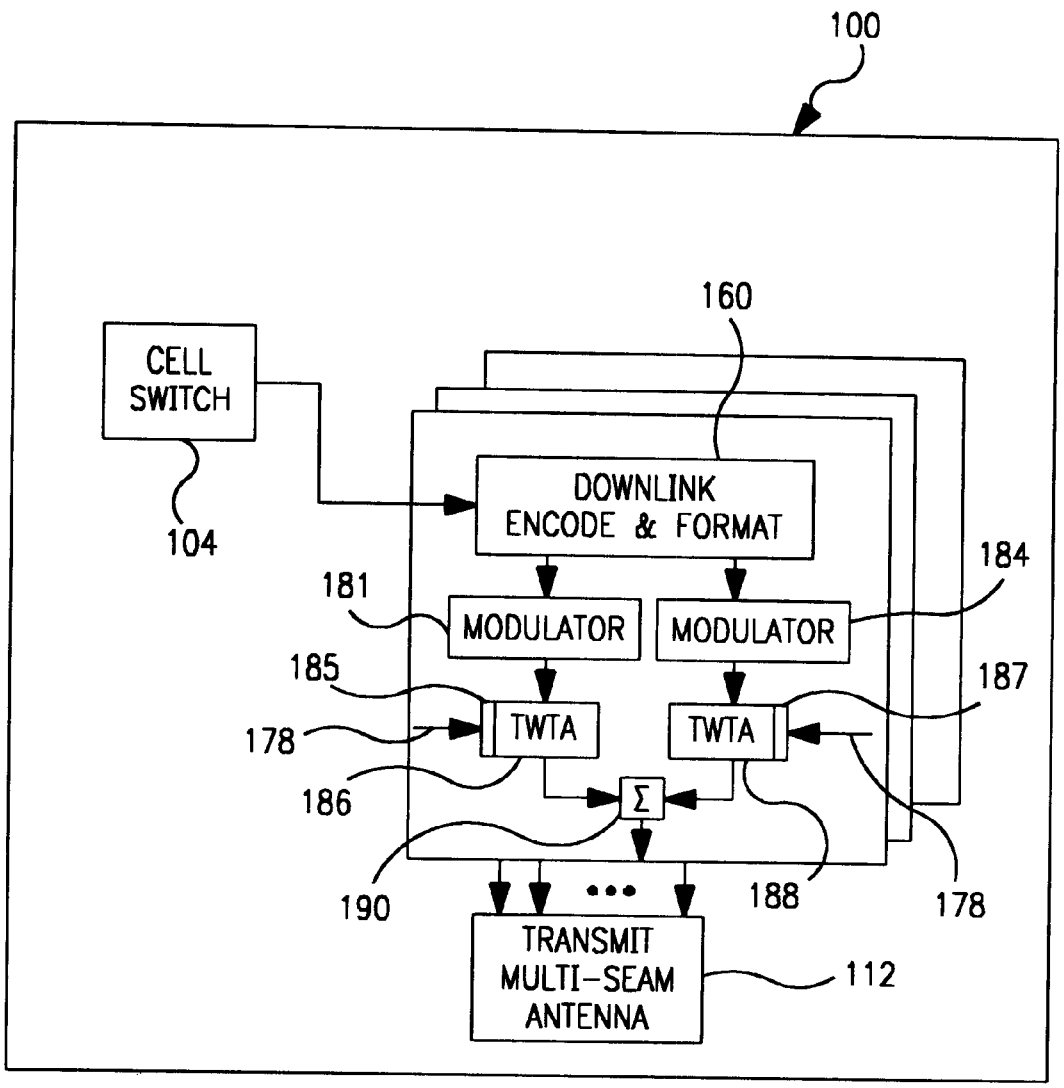
FIG. 7 is a schematic block diagram illustrating some of the satellite circuitry shown in FIG. 1.
Figure 8:
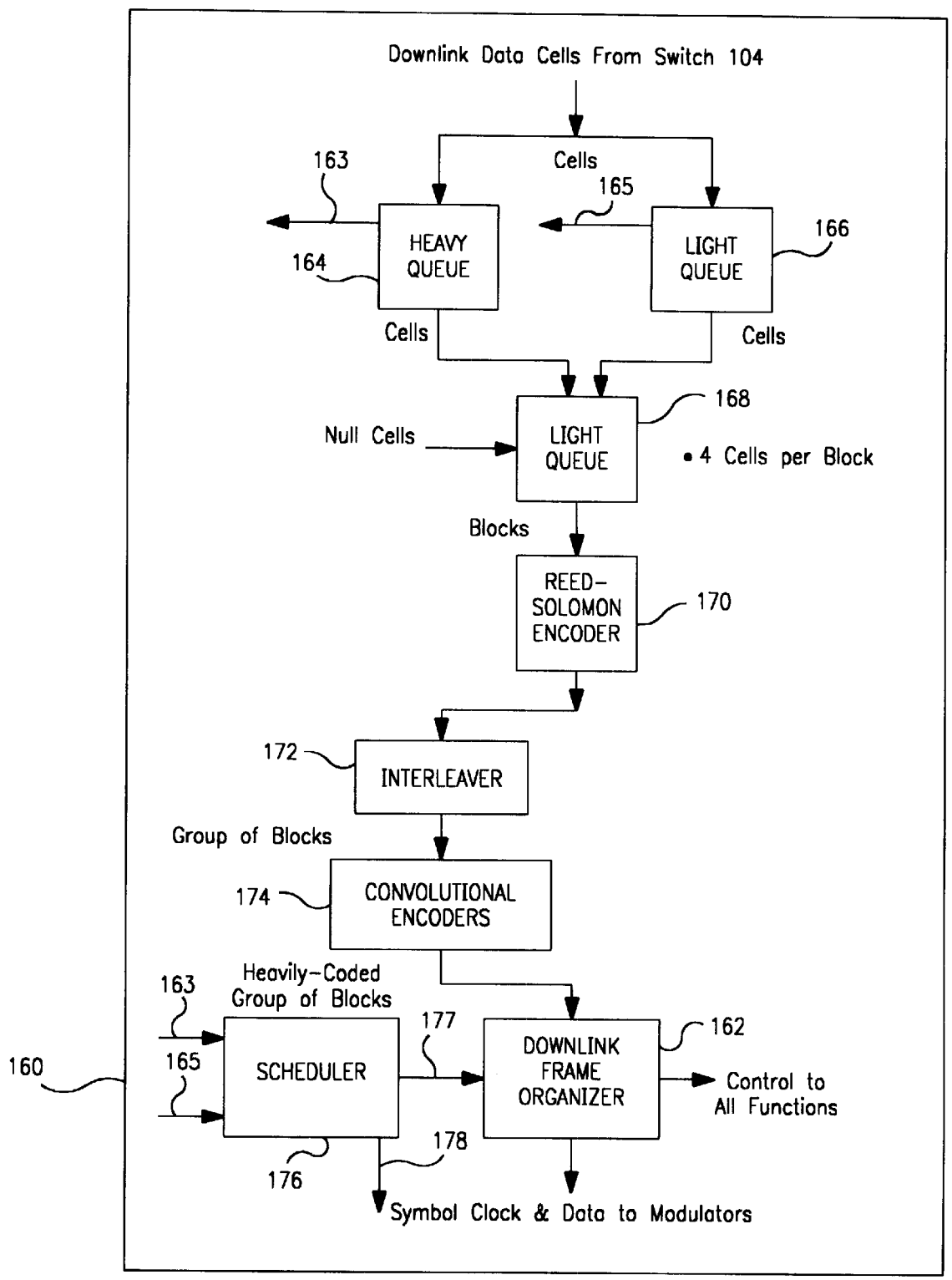
FIG. 8 is a schematic block diagram of the downlink encode and format circuitry shown in FIG. 7.

FIGS. 7 and 8 are block diagrams of the satellite 100 downlink transmission components. The downlink encode and format module 160 (FIG. 7) is shown in more detail in FIG. 8.

The master timing system at the satellite commands the formation of a downlink frame at intervals of 79.31 microseconds. When so commanded, the downlink frame organizer (DFO) 162 begins its task by determining whether heavily coded blocks of cells or lightly coded block of cells are to be placed into a frame or whether an empty (power gated) frame is to be formed. The determination is based on the signals received from a scheduler 176 over a bus 177. The scheduler determines the size of the queues in queue memories 164 and 166 based on the data received over buses 163 and 165. Scheduler 176 then generates a first frame type signal if heavily coded blocks are to be used, a second frame type signal if an empty frame is to be formed and a third frame type signal if lightly coded blocks are to be used. Scheduler 176 also generates a gating signal on a conductor 178 if the second frame type signal is generated indicating that an empty frame will be sent. The gating signal deactivates TWTAs 186 and 188 at the appropriate time when the frame body would be transmitted in order to reduce power consumption. The TWTAs include gates 185 and 187 (FIG. 7) which deactivate the TWTAs in response to the gating signal on conductor 178.

In response to the signals received from scheduler 176, DFO 162 first forms blocks, each of four cells, each cell of 53 bytes. The cells to fill these blocks are obtained from the output queue section of the satellite 100 fast cell switch 104 upon request by the DFO 162 (FIG. 8). If a heavy frame is being formed and the switch is unable to supply 12 cells from the heavy coded queue memory 164, then the DFO 162 requests cells from the lightly loaded queue memory 166 until the blocks for heavy coding are filled out. If all queues are exhausted, then the DFO 162 fills out the remaining blocks with null cells in a block former 168. If a light frame is being formed, then the DFO begins to fill out the blocks for the lightly coded downlink frame. If the supply of cells from the switch's light code queue is exhausted before the blocks are formed, then the remaining block content is filled out with null cells.

After the blocks required for the downlink frame are prepared, each block is used to generate a byte parity attachment to itself to form the coded block of a (236,212) Reed-Solomon code. This operation is performed by a Reed-Solomon encoder 170 (FIG. 8).

Blocks produced by the outer encoder are inserted by an interleaver 172 in a rectangular interleaving array as the next step in forming the downlink frame.

This array, read by columns, forms the input to two convolutional encoder 174 which expands the bits of the interleaver array to encoded bits (plus a tail off) which are organized as a linear string of dibits which will be presented to the downlink modulators 182 and 184 (FIG. 7).

After the outer and inner code actions have been completed, a string totaling 7552 symbols comprising the body of the downlink frame is ready for transmission. To this is prepended and postpended the other fields shown in FIG. 4. The total downlink frame is presented to the downlink modulator circuits 182 and 184 (FIG. 7) at a rate of 98.35 MHz (196.7 megachips/second) in an unbroken string from one downlink frame to the next.

The dibit stream produced by the DFO 162 is passed to the downlink modulators 182 and 184 as a continuous stream clocked at 98.35 MHz, i.e. the basic downlink rate. This stream is entered into a pair of transversal filters which produce two shaping functions consisting of a set of 393.4 MHz samples which define the envelope of spectrally compact shaped symbols formed by raised cosine 25% shaping of staggered QPSK. These samples are converted to the analog realm by means of a pair of high speed digital to analog devices. After passage through zonal filters, the resultant waveforms constitute the modulation waveforms for the I and Q components of the downlink. These waveforms are passed to a balanced mixer circuit which is also fed by the local oscillator for the downlink IF.

The resultant downlink IF is then upconverted to a specific band in the 20 GHz range using one of 8 different mixing frequencies, depending on which downlink band is being created, to form the drive signal for the high power amplifiers of satellite 100.

The satellite 100 may have two types of high power amplifiers (HPA), lower power or higher power traveling wave tube amplifiers (TWTA) 186 and 188 (FIG. 7). Generally, the smaller amplifier is intended to serve earth terminals for large volume users: such terminals may be expected to have much larger antennas than those for the low volume, lower availability users.

The drive signals to the HPAs are calibrated to place the operating point of the TWTAs at a level which optimizes the performance of the downlink, including the demodulator of UET 400.

The outputs of the HPAs are passed by waveguide to the downlink feed associated with the particular beam to which the signals are destined. This feed illuminates a parabolic antenna 112 which reflects the signal into a narrow beam (about 0.4 arcdegrees from midbeam to edge of coverage) resulting in an effective gain of about 48.0 dB (60,000 times) and an EIRP, for the band served by the higher power TWTA, of nearly 61 dBW (or 1.25 megawatts). As a result of the spectral shaping performed during the modulation process, the transmitted spectrum of each 98.35 megasymbol/second downlink band has good roll-off and is predominantly contained within the 125 MHz.

The circularly polarized signals of the two bands in the beam propagate downwards, subject to spreading loss, absorption and rain fading.

This section of the specification discusses the processing steps and the requisite equipment used by UET 400 to capture the downlink signal, demodulate it, recover the downlink frames, and decode, deinterleave and disassemble the blocks contained in the frame to extract the downlink cell flow. It also discusses how the transmission subsystem interacts with the UET's control subsystems to sieve the cells to determine which ones are relevant to the UET.

Downlink UET 400 transmission functions are performed partially outdoors and partially indoors. The indoor functions are predominately embodied in the Downlink Baseband Unit (DBU) 440 (FIG. 9) in the UET 400 (FIG. 1) which provides all baseband processing for the entire downlink regardless of the number of Uplink Baseband Units present in the UET 400.

Referring to FIGS. 1, 2, 9 and 10, the 20 GHz downlink signal for the UET's band is captured by the terminal's antenna 406 (FIG. 2). This antenna may be of any size, although 75 centimeters is a practical minimum. Generally, smaller size antennas will provide inadequate downlink rain margin and/or will have insufficient discrimination against signals from adjacent Ka-band satellite systems.

Although of modest physical dimensions, even the smallest antenna is optically fairly large, having a beam width of about 0.8 or 1.2 arcdegrees on the uplink or downlink, respectively. This implies that even the smallest antennas for the system must be mounted on a rugged mount and carefully aimed at the satellite 100. Larger antennas, above 1.5 meters, for example, may require an automatic pointing subsystem to avoid excessive gain loss due to satellite motion, wind deflection, et cetera.

Note that most terminals, such as UET 400, will utilize the same physical reflector for both reception and transmission. Such two-way antennas are fitted with a two-port feed, one port of which collects the downlink signal and passes it to the colocated low noise amplifier via a diplexor.

Figure 9:
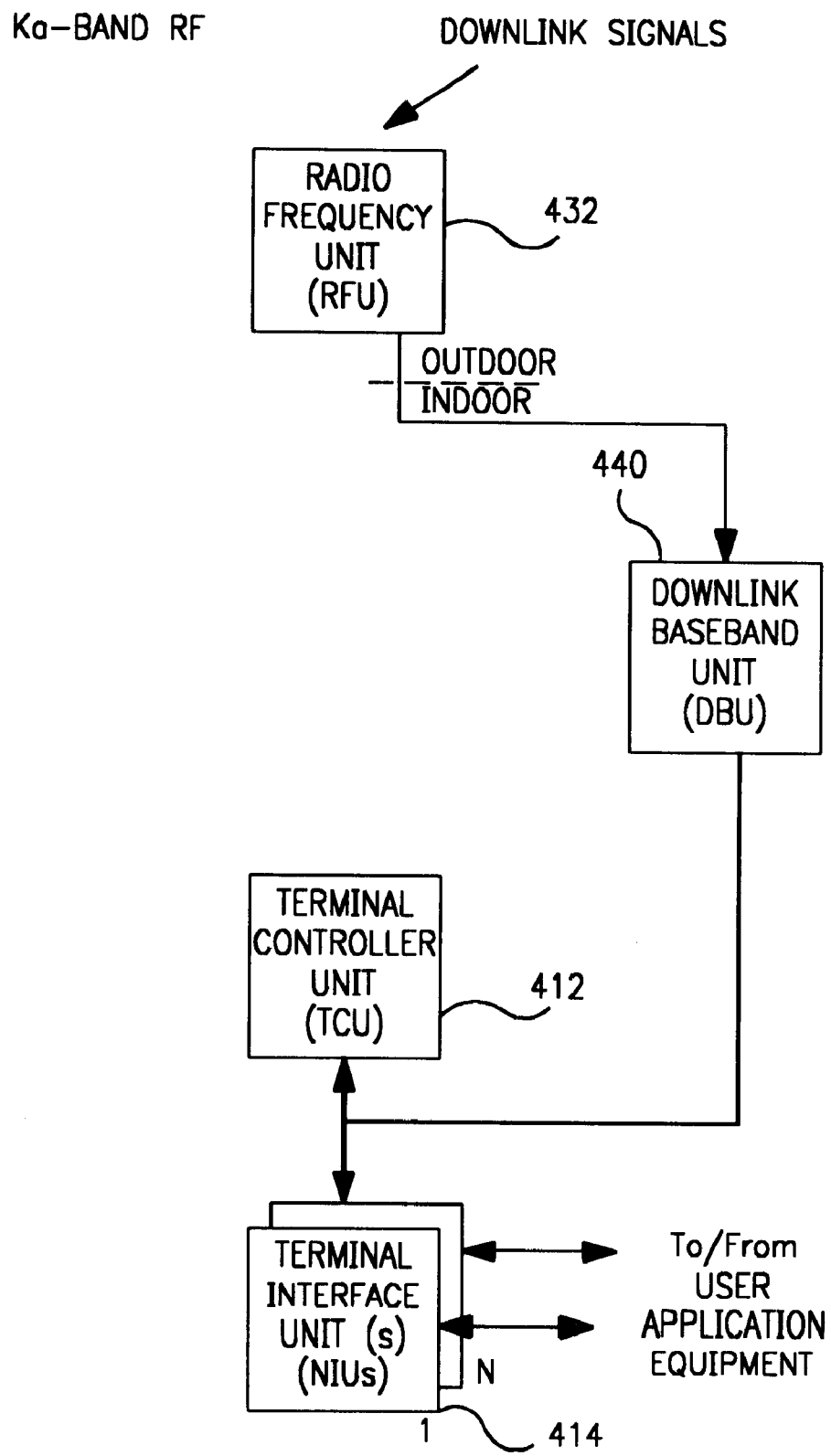
FIG. 9 is a schematic block diagram of a portion of the earth terminal circuitry shown in FIG. 1.

The downlink signal is amplified and downconverted to an intermediate frequency in a single stage low noise block down-converter (LNB) (not shown) located in the outdoor portion 432 of the user earth terminal (FIG. 9). The LNB uses high electron mobility transistors (HEMT) which provide high gain with little noise. The clear sky noise temperature of the terminal is approximately 180 kelvins including sky noise, antenna noise, and first amplifier noise. During stressed conditions of heavy precipitation, however, the effective system noise temperature can rise to nearly 500 kelvins as a result of excess sky noise induced by rain mass in the antenna's field of view.

The LNB has as an input a local oscillator signal at one of eight frequencies (switch selectable) to translate the UET's downlink band to a common intermediate frequency for transfer from the outdoor to the indoor portions of the UET 400 on the interconnecting coaxial cable after filtering to limit the transferred signal to the 125 MHz of the desired band.

Figure 10:
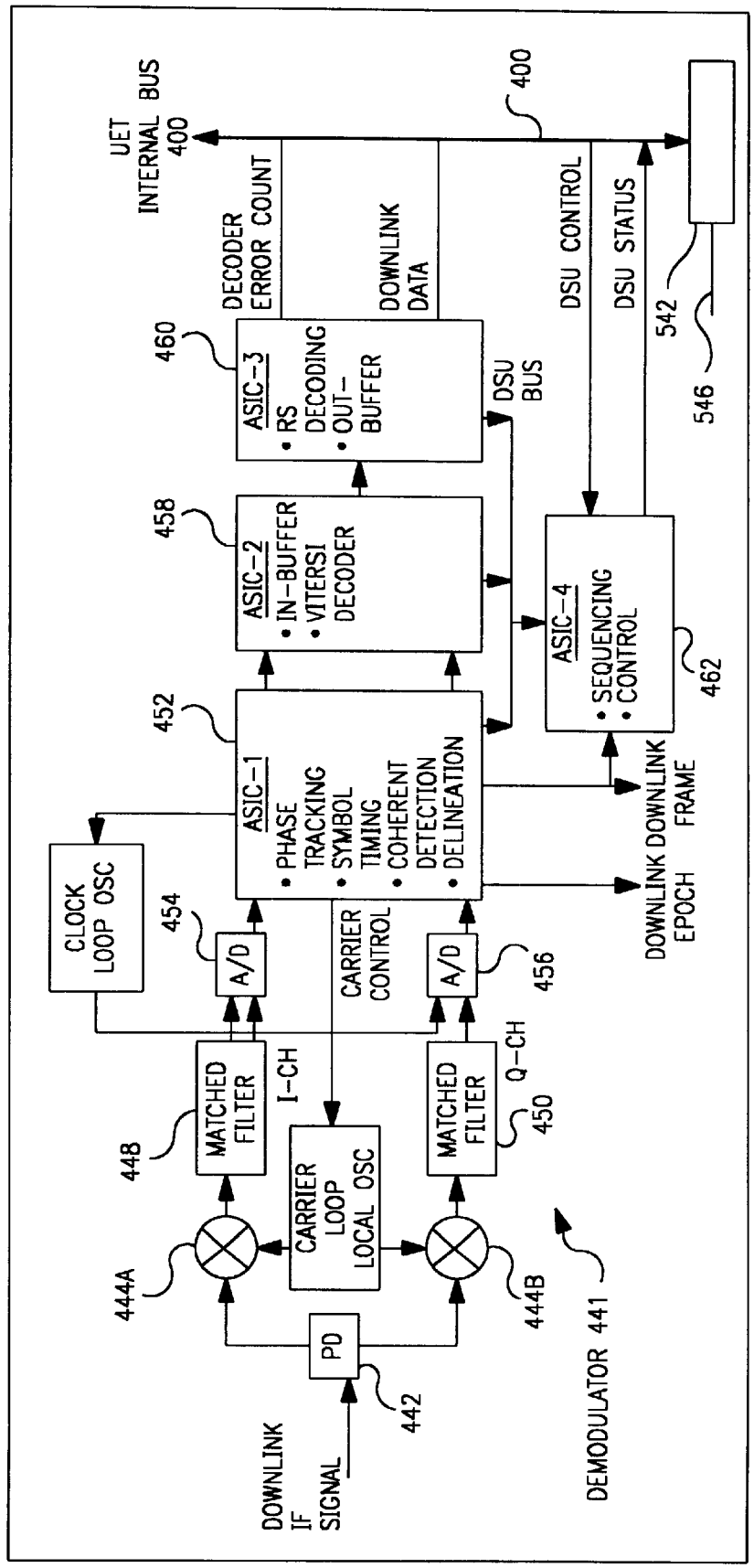
FIG. 10 is a schematic block diagram showing, in more detail, a portion of the circuitry illustrated in FIG. 9.

The downlink band signal is presented to a 98.35 megasymbol/sec. continuous demodulator 441 (FIG. 10). This equipment first separates the IF signal into I and Q baseband components by means of a power divider (PD) 442, balanced mixers 444A and 444B and a local oscillator signal generated by an oscillator 446. These two baseband signals are then passed through analog filters 448 and 450 approximately matched to the symbol shaping functions used at the satellite 100 and then each is sampled at a rate of 196.7 megasamples/second (two samples per symbol) and passed to a digital demodulator ASIC 452 through analog to digital converters 454 and 456.

ASIC 452 processes the baseband downlink to recover the data content of the waveforms. Functions embodied in the demodulator ASIC 452 include phase tracking, frequency difference estimation, symbol timing tracking, and coherent detection of the downlink data. The primary outputs of the ASIC 452 are soft decisions which are passed to a buffer for collection of a downlink frame which is to be disassembled. Also within the ASIC 452 is circuitry to detect the downlink synchronization sequence and to produce associated strobes which harmonize the entry of data into a buffer with the downlink frame structure.

An auxiliary function of ASIC 452 is to track the downlink symbol rate of 98.35 MHz and to provide feedback adjustment to a voltage controlled oscillator in the UET's master oscillator section to cause the UET's clock system to be tightly locked to that of the satellite's (as seen with Doppler shift).

Other functions of the demodulator ASIC 452 include providing a corrective signal to slew the LNB's down conversion to match the frequency of the downlink.

Upon reception of a strobe from the demodulator ASIC 452 reflecting the arrival of a complete downlink frame, the UET's inner code decoder 458 is set to work. This decoder 458 implements Viterbi's algorithm and is embodied in an ASIC which accepts soft decision inputs from the buffer, decodes based on these observables, and places the results in a de-interleaving array, writing by column.

After the deinterleaving array is filled, the contents are passed to the outer decoder 460. After the body of the frame has been inner code decoded, the blocks in the frame are presented one by one to the ASIC 460 which implements the Reed-Solomon decoding process for each of the blocks of received downlink data. The steps performed by the decoder are identical with those described for the satellite's uplink decoder described in the application Ser. No. 09/408,331 entitled "Uplink Transmission and Reception Techniques for a Processing Communication Satellite", filed in the names of Wright et al. on the same day as this application, and assigned to the same assignee as this application, and incorporated by reference into this application.

Blocks that complete the outer code decoding process satisfactorily are truncated to the original 212 information bytes by discarding the 24 byte parity field. As each block is decoded, it is resolved into four ATM cells of 53 bytes each.

Figure 11:
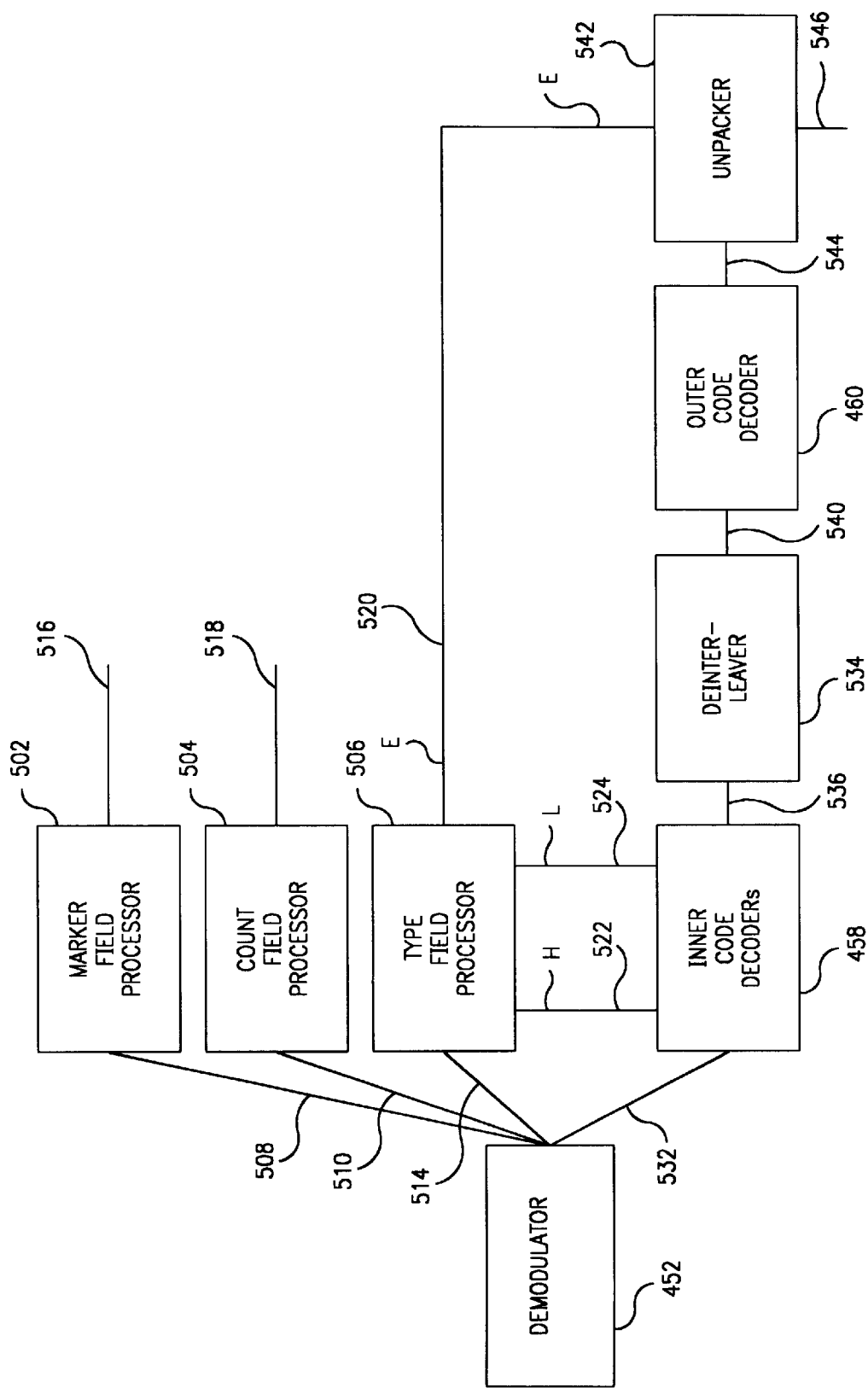
FIG. 11 is a schematic block diagram showing in more detail a portion of the circuitry illustrated in FIG. 10.

FIG. 11 illustrates additional circuitry which cooperates with the circuitry shown in FIG. 10. Demodulator 452 is connected to a marker field processor 502 over a bus 508; to a count field processor 504 over a bus 510 and to a type field processor 506 over a bus 514.

Marker field processor 502 generates output signals on a conductor 516 which indicate timing information obtained from the frame marker symbols shown in FIG. 4. The timing information is used to delineate data frames and to resolve modulation ambiguity.

Count field processor 504 generates output signals on a conductor 518 which indicate a non-repeating frame number of the frame most recently demodulated by demodulator 452. The frame number is obtained from the frame count symbols of the header shown in FIG. 4. The frame number does not repeat over the anticipated life of the satellite.

Type field processor 506 generates a signal on a conductor 520 indicating a substantially empty (E) data frame with a high percentage of null symbols; generates a signal on a conductor 522 indicating a heavily (H) coded data frame and generates a signal on a conductor 524 indicating a lightly (L) coded data frame. The signals on conductors 522 and 524 are conducted to inner code decoder 458 in order to facilitate the inner code decoding process.

Two inner code decoders 458 are connected to the output of demodulator 452 by a bus 532. A deinterleaver 534 is connected to the output of inner code decoder 458 by a bus 536. The output of the deinterleaver is connected to outer code decoder 460 over another bus 540. The deinterleaver deinterleaves the outer code blocks from the inner code blocks in a well known manner.

The output of decoder 460 is connected to an unpacker 542 over a bus 544. The unpacker uses the E signal on conductor 520 to prevent creating output cells from empty frames. Alternatively, decoders 458 and 460 will automatically reject blocks containing noise only so that no output is transmitted over bus 544.

As complete cells become available within the DBU 440 (FIG. 9), the cell header is isolated and the four byte portion containing the cell addressing is passed from the DBU 440 to the UET's terminal controller 412. Among the functions of controller 412 is sorting out which cells are relevant to the UET 400 (FIG. 1). For those cells which are relevant to the UET 400, the Terminal Controller 412 initiates commands to place the 53 byte cell on the UET's internal bus for transfer to itself and/or to one of the NIC's installed in the UET 400.

The operation of ASIC's 452, 458 and 460 is controlled by another ASIC 462 (FIG. 10). Additional details about synchronizing the operation of satellite 100, NOC 300 and UET 400 is described in "Synchronization Method For A Processing Communication Satellite," filed herewith in the names of David A. Wright, et al., and identified as docket no. TRW 22-0056, which is incorporated by reference and which is assigned to the same assignee as the present application.

Additional details about the transmission gating of satellite 100, are described in U.S application Ser. No. 09/270,361, entitled "Gated Power Time Division Downlink For A Processing Satellite," filed Mar. 16, 1999 in the names of Stewart T. Linsky, et al., which is incorporated by reference and assigned to the same assignee as the present application.

Those skilled in the art will appreciate that the preferred form of the invention may be modified and changed without departing from the true spirit and scope of the invention as defined in the accompanying claims.

What is claimed is:

1. In a processing satellite communication system, apparatus for generating and transmitting data in an available spectrum of frequencies suitable for use by a downlink transmitting system of a processing satellite comprising in combination:

a terminal connected to receive data cells for transmission;

a scheduler connected to generate a first frame type signal and a second frame type signal;

one or more encoders connected to group a predetermined number of the data cells with a predetermined error correction code;

a frame organizer connected to generate from said data cells a first type of frame body in response to said first frame type signal and to generate a second type of frame body in response to said second frame type signal and to group the frame bodies with header symbols and with trailer symbols to generate data frames comprising a predetermined number of symbols;

one or more modulators connected to modulate the data frames by a predetermined form of modulation to enable placement of the modulated data frames into a plurality of frequency bands having a predetermined frequency range and having a predetermined transmission rate definable in megasymbols per second;

a radio frequency transmitter connected to transmit the modulated data frames over one or more beams with a predetermined form of polarization; and a gate arranged to reduce power in response to said second frame type signal.

2. Apparatus, as claimed in claim 1, wherein said first type of frame body comprises more data than said second type of frame body.

3. Apparatus, as claimed in claim 1, wherein at least some of said beams are limited to a single predetermined form of polarization and wherein said modulators modulate the data frames to generate a serial TDM stream of modulated data frames for each of said beams limited to said single predetermined form of polarization.

4. Apparatus, as claimed in claim 1, wherein said header symbols comprise:

frame marker symbols for delineating said data frames and for resolving modulation ambiguity;

non-repeating frame number symbols indicating frame numbers of said data frames which do not repeat over the expected life of said satellite; and frame type symbols indicating different types of said data frames.

5. Apparatus, as claimed in claim 4, wherein said frame type comprises an indicator of the inner code being used in the frame.

6. Apparatus, as claimed in claim 4, wherein said frame marker symbols enable tracking by correlation with a known pattern of such marker symbols.

7. Apparatus, as claimed in claim 4, wherein said frame type symbols comprise redundant and error control coding.

8. Apparatus, as claimed in claim 1, wherein said frame bodies comprise inner code blocks and outer code blocks and wherein said inner code blocks are partitioned into two separate independently decodable quadrature components.

9. Apparatus, as claimed in claim 8, wherein said inner code blocks are modulated with quaternary phase shift keying (QPSK).

10. Apparatus, as claimed in claim 8, wherein said inner code blocks are convolutionally coded.

11. Apparatus, as claimed in claim 1, wherein said predetermined frequency range divided by said predetermined transmission rate is in the range of 1.2 to 1.3.

12. Apparatus, as claimed in claim 1, wherein said predetermined form of modulation further comprises square-root raised cosine pulse shaping on quadraphase phase shift keying.

13. Apparatus, as claimed in claim 1, wherein the one or more modulators increase the rates of the generated frequencies to form carrier frequencies and wherein the carrier frequencies are transmitted by said transmitter with at least two different forms of polarization.

14. Apparatus, as claimed in claim 13, wherein the different forms of polarization comprise forms of polarization selected from the group consisting of right hand circular polarization, left hand circular polarization and both right hand and left hand circular polarization.

15. Apparatus, as claimed in claim 1, wherein the one or more beams comprises a plurality of beams transmitted to a plurality of earth locations using at least some of the same carrier frequencies so that the carrier frequencies may be reused spatially by the satellite.

16. Apparatus, as claimed in claim 1, wherein the one or more modulators generate a sufficient number of different frequencies so as to allow up to a predetermined number of bands of frequencies within the available spectrum of frequencies and wherein the beams are arranged in a cluster configuration in which each cluster includes the predetermined number of bands and each band occupies a different portion of the available spectrum of frequencies.

17. Apparatus, as claimed in claim 16, wherein the predetermined number of bands is four.

18. Apparatus, as claimed in claim 16, wherein the bands are transmitted with at least two different polarizations.

19. Apparatus, as claimed in claim 1, wherein the predetermined number of data cells is four.

20. Apparatus, as claimed in claim 1, wherein the predetermined error correction code comprises Reed-Solomon code.

21. Apparatus, as claimed in claim 1, wherein the frame bodies bear four times K ATM cells and comprises K code words where K=3 or 6.

22. Apparatus, as claimed in claim 1, wherein the transmission rate of at least some of the bands is 90–100 megasymbols per second.

23. Apparatus, as claimed in claim 22, wherein the frequency range of at least some of the bands is substantially 125 MHz.

24. Apparatus, as claimed in claim 1, wherein at least some of the frames include null symbols so that each frame includes a predetermined number of symbols irrespective of the amount of data in the frame.

25. Apparatus, as claimed in claim 1, wherein the one or more encoders comprise an inner encoder, wherein the correction code comprises an inner code generated by the inner encoder and wherein at least some of the frames include flush bits resulting from tailing off of the inner encoder.

26. Apparatus, as claimed in claim 25, wherein said inner code defines an inner code rate of substantially 3/8 or 6/8.

27. Apparatus, as claimed in claim 1, wherein the one or more encoders comprise an outer encoder connected to generate blocks of outer code in at least some of the data frames and wherein the blocks including outer code are interleaved.

28. Apparatus, as claimed in claim 27, wherein the interleaved code blocks comprise three or six outer code blocks depending on whether the coding is light or heavy.

29. In a processing satellite communication system, a method of generating and transmitting data in an available spectrum of frequencies suitable for use by a downlink transmitting system of a processing satellite comprising the steps of:
   receiving data cells for transmission;
   generating a first frame type signal;
   generating a second frame type signal;
   grouping a predetermined number of the data cells with a predetermined error correction code to generate a first type of frame body in response to said first frame type signal and to generate a second type of frame body in response to said second frame type signal;
   grouping the frame bodies with header symbols and with trailer symbols to generate data frames comprising a predetermined number of symbols;
   modulating the data frames by a predetermined form of modulation to enable placement of the modulated data frames into a plurality of frequency bands having a predetermined frequency range and having a predetermined transmission rate definable in megasymbols per second; and
   transmitting the modulated data frames over one or more beams with a predetermined form of polarization; and
   reducing power in response to said first frame type signal.

30. A method, as claimed in claim 29, wherein said first type of frame body comprises more data than said second type of frame body.

31. A method, as claimed in claim 29, wherein the predetermined form of modulation further comprises square-root raised cosine pulse shaping on quadraphase phase shift keying.

32. A method, as claimed in claim 29, wherein the transmission rate of at least some of the bands is 90–100 megasymbols per second.

33. A method, as claimed in claim 29, wherein the frequency range of at least some of the bands is substantially 125 MHz.

34. A method, as claimed in claim 29, wherein the step of modulating comprises the step of increasing the rates of the generated frequencies to form carrier frequencies and wherein the step of transmitting comprises the step of transmitting the carrier frequencies with at least two different forms of polarization.

35. A method, as claimed in claim 34, wherein the predetermined forms of polarization comprise forms of polarization selected from the group consisting of right hand circular polarization, left hand circular polarization and both right hand and left hand circular polarization.

36. A method, as claimed in claim 29, wherein the one or more beams comprises a plurality of beams transmitted to a plurality of earth locations using at least some of the same carrier frequencies so that the carrier frequencies may be reused spatially by the satellite.

37. A method, as claimed in claim 29, wherein the step of modulating comprises the step of generating a sufficient number of different frequencies so as to allow up to a predetermined number of bands of frequencies within the available spectrum of frequencies and arranging the beams in a cluster configuration in which each cluster includes the predetermined number of bands and each band occupies a different portion of the available spectrum of frequencies.

38. A method, as claimed in claim 37, wherein the predetermined number of bands is four.

39. A method, as claimed in claim 29, wherein the bands are transmitted with at least two different polarizations.

40. A method, as claimed in claim 29, wherein at least some of the frames include null symbols so that each frame includes a predetermined number of symbols irrespective of the amount of data in the frame.

41. A method, as claimed in claim 29, wherein said steps of grouping comprise the step of generating an inner code and wherein at least some of the frames include flush bits resulting from tailing off of the inner code generating.

42. A method, as claimed in claim 29, wherein the steps of grouping comprise the step of generating blocks of an outer code in at least some of the frame bodies and further comprise the step of interleaving the blocks including the outer code.

43. A method, as claimed in claim 29, wherein at least some of said beams are limited to a single predetermined form of polarization and wherein said modulating comprises generating a serial TDM stream of modulated data frames for each of said beams limited to said single predetermined form of polarization.

44. A method, as claimed in claim 29, wherein said header symbols comprise:
   frame marker symbols for delineating said data frames and for resolving modulation ambiguity;
   non-repeating frame number symbols indicating frame numbers of said data frames which do not repeat over the expected life of said satellite; and
   frame type symbols indicating different types of said data frames.

45. A method, as claimed in claim 44, wherein said frame type comprises an indicator of the inner code being used in the frame.

46. A method, as claimed in claim 44, wherein said frame marker symbols enable tracking by correlation with a known pattern of such marker symbols.

47. A method, as claimed in claim 44, wherein said frame type symbols comprise redundant and error control coding.

48. A method, as claimed in claim 29, wherein said frame bodies comprise inner code blocks and outer code blocks and wherein said inner code blocks are partitioned into two separate independently decodable quadrature components.

49. A method, as claimed in claim 48, wherein said inner code blocks are modulated with quaternary phase shift keying (QPSK).

50. A method, as claimed in claim 48, wherein said inner code blocks are convolutionally coded.

51. A method, as claimed in claim 29, wherein said predetermined frequency range divided by said predetermined transmission rate is in the range of 1.2 to 1.3.

52. A method, as claimed in claim 29, wherein the frame bodies bear four times K ATM cells and comprises K code words where K=3 or 6.

53. A method, as claimed in claim 41, wherein said inner code defines an inner code rate of substantially 3/8 or 6/8.

54. A method, as claimed in claim 42, wherein the blocks including outer code comprise three or six outer code blocks depending on whether the coding is light or heavy.

55. A method, as claimed in claim 29, wherein the predetermined number of data cells is four.

56. A method, as claimed in claim 29, wherein the predetermined error correction code comprises Reed-Solomon code.

57. In a processing satellite communication system, apparatus suitable for receiving and processing radio carrier signals in an available spectrum of frequencies transmittable by a processing satellite in a downlink comprising in combination:

one or more antennas connected to respond one or more beams of the radio carrier signals having one or more forms of polarization;

one or more demodulators connected to demodulate the radio carrier signals into data frames comprising a frame body and a header including a frame type from a plurality of frequency bands having a predetermined frequency range and having a predetermined transmission rate definable in megasymbols per second;

a header processor connected to decode the frame type into a first frame type and a second frame type;

one or more decoders connected to decode said frame bodies of said data frames into a predetermined number of data cells in response to the first frame type; and an output terminal connected to transmit a first number of the data cells for further processing in response to the first frame type and to transmit less than the first number of data cells for further processing in response to the second frame type.

58. Apparatus, as claimed in claim 57, wherein said first type of frame body comprises more data than said second type of frame body.

59. Apparatus, as claimed in claim 57, wherein at least some of said beams are limited to a single predetermined form of polarization and wherein said one or more demodulators demodulate the data frames from a serial TDM stream of modulated data frames for each of said beams limited to said single predetermined form of polarization.

60. Apparatus, as claimed in claim 57, wherein said header symbols comprise:

frame marker symbols for delineating said data frames and for resolving modulation ambiguity;

non-repeating frame number symbols indicating frame numbers of said data frames which do not repeat over the expected life of said satellite; and frame type symbols indicating different types of said data frames.

61. Apparatus, as claimed in claim 57, wherein said frame type comprises an indicator of the inner code being used in the frame.

62. Apparatus, as claimed in claim 60, wherein said frame marker symbols enable tracking by correlation with a known pattern of such marker symbols.

63. Apparatus, as claimed in claim 60, wherein said frame type symbols comprise redundant and error control coding.

64. Apparatus, as claimed in claim 57, wherein said frame bodies comprise inner code blocks and outer code blocks and wherein said inner code blocks are partitioned into two separate independently decodable quadrature components.

65. Apparatus, as claimed in claim 64, wherein said inner code blocks are modulated with quaternary phase shift keying (QPSK).

66. Apparatus, as claimed in claim 64, wherein said inner code blocks are convolutionally coded.

67. Apparatus, as claimed in claim 57, wherein said predetermined frequency range divided by said predetermined transmission rate is in the range of 1.2 to 1.3.

68. Apparatus, as claimed in claim 57, wherein the predetermined form of modulation further comprises square-root raised cosine pulse shaping on quadraphase phase shift keying.

69. Apparatus, as claimed in claim 57, wherein the one or more demodulators demodulate a sufficient number of different frequencies so as to allow up to a predetermined number of bands of frequencies within the available spectrum of frequencies.

70. Apparatus, as claimed in claim 57, wherein the transmission rate of at least some of the bands is 90–100 megasymbols per second.

71. Apparatus, as claimed in claim 57, wherein the frequency range of at least some of the bands is substantially 125 MHz.

72. Apparatus, as claimed in claim 57, wherein the one or more antennas respond to at least two different forms of polarization.

73. Apparatus, as claimed in claim 57, wherein the one or more forms of polarization comprises a form of polarization selected from the group consisting of right hand circular polarization, left hand circular polarization and both right hand and left hand circular polarization.

74. Apparatus, as claimed in claim 57, wherein the one or more beams comprises a plurality of beams transmitted to a plurality of earth locations using at least some of the same carrier frequencies so that the carrier frequencies may be reused spatially by the satellite.

75. Apparatus, as claimed in claim 57, wherein the one or more demodulators demodulate a sufficient number of different frequencies so as to allow up to a predetermined number of bands of frequencies within the available spectrum of frequencies and wherein the beams are arranged in a cluster configuration in which each cluster includes the predetermined number of bands and each band occupies a different portion of the available spectrum of frequencies.

76. Apparatus, as claimed in claim 57, wherein the predetermined number of bands is four.

77. Apparatus, as claimed in claim 57, wherein the bands are received with at least two different polarizations.

78. Apparatus, as claimed in claim 57, wherein at least some of the frames include null symbols so that each frame includes a predetermined number of symbols irrespective of the amount of data in the frame.

79. Apparatus, as claimed in claim 57, wherein the one or more decoders comprise an inner decoder, wherein the correction code comprises an inner code decoded by the inner decoder and wherein at least some of the frames include flush bits resulting from tailing off of the inner decoder.

80. Apparatus, as claimed in claim 79, wherein the inner code rate is substantially 3/8 or 6/8.

81. Apparatus, as claimed in claim 79, wherein the inner code is partitioned into two separate independently decodable quadrature components.

82. Apparatus, as claimed in claim 57, wherein the one or more decoders comprise an outer decoder, wherein the correction code comprises blocks of an outer code, wherein at least some of the frame bodies include blocks of the outer code and wherein the blocks including outer code are interleaved.

83. Apparatus, as claimed in claim 82, wherein the interleaver code blocks include three or six outer code blocks depending on whether the coding is light or heavy.

84. Apparatus, as claimed in claim 57, wherein the one or more decoders decode the frame bodies with error correction code comprising Reed-Solomon code.

85. Apparatus, as claimed in claim 57, wherein the frame bodies bear four times K ATM cells and comprises K code words where K=3 or 6.

86. In a processing satellite communication system, a method of receiving and processing radio carrier signals in an available spectrum of frequencies transmittable by a processing satellite in a downlink comprising the steps of:
receiving to one or more beams of the radio carrier signals having one or more forms of polarization;
demodulating the radio carrier signals into a plurality of frequency bands having a predetermined frequency range and having a predetermined transmission rate definable in megasymbols per second;
demodulating the frequency bands into data frames;
decoding the data frames into frame bodies with header symbols defining a frame type and with trailer symbols;
decoding the frame type into a first frame type and a second frame type;
decoding the frame bodies into a predetermined number of data cells using a predetermined error correction code;
transmitting a first number of the data cells for further processing in response to the first frame type; and
transmitting a second number of the data cells less than the first number for further processing in response to the second frame type.

87. A method, as claimed in claim 86, wherein the first frame type indicates a data frame with more data than the second frame type.

88. A method, as claimed in claim 86, wherein the predetermined error correction code comprises Reed-Solomon code.

89. A method, as claimed in claim 86, wherein the predetermined form of modulation comprises square-root raised cosine pulse shaping on quadraphase phase shift keying.

90. A method, as claimed in claim 86, wherein the transmission rate of at least some of the bands is 90–100 megasymbols per second.

91. A method, as claimed in claim 86, wherein the frequency range of at least some of the bands is substantially 125 MHz.

92. A method, as claimed in claim 86, wherein the step of receiving comprises the step of responding to at least two different forms of polarization.

93. A method, as claimed in claim 92, wherein the predetermined forms of polarization comprise forms of polarization selected from the group consisting of right hand circular polarization, left hand circular polarization and both right hand and left hand circular polarization.

94. A method, as claimed in claim 86, wherein the one or more beams comprises a plurality of beams transmitted to a plurality of earth locations using at least some of the same carrier frequencies so that the carrier frequencies may be reused spatially.

95. A method, as claimed in claim 86, wherein the step of demodulating comprises the step of demodulating a sufficient number of different frequencies so as to allow up to a predetermined number of bands of frequencies within the available spectrum of frequencies and wherein the beams are arranged in a cluster configuration in which each cluster includes the predetermined number of bands and each band occupies a different portion of the available spectrum of frequencies.

96. A method, as claimed in claim 95, wherein the predetermined number of bands is four.

97. A method, as claimed in claim 86, wherein the bands are received with at least two different polarizations.

98. A method, as claimed in claim 86, wherein at least some of the frames include null symbols so that each frame includes a predetermined number of symbols irrespective of the amount of data in the frame.

99. A method, as claimed in claim 86, wherein said header symbols comprise:
frame marker symbols for delineating said data frames and for resolving modulation ambiguity;
non-repeating frame number symbols indicating frame numbers of said data frames which do not repeat over the expected life of said satellite; and
frame type symbols indicating different types of said data frames.

100. A method, as claimed in claim 86, wherein said frame type comprises an indicator of the inner code being used in the frame.

101. A method, as claimed in claim 99, wherein said frame marker symbols enable tracking by correlation with a known pattern of such marker symbols.

102. A method, as claimed in claim 99, wherein said frame type symbols comprise redundant and error control coding.

103. A method, as claimed in claim 86, wherein said frame bodies comprise inner code blocks and outer code blocks and wherein said inner code blocks are partitioned into two separate independently decodable quadrature components.

104. A method, as claimed in claim 103, wherein said inner code blocks are modulated with quaternary phase shift keying (QPSK).

105. A method, as claimed in claim 103, wherein said inner code blocks are convolutionally coded.

106. A method, as claimed in claim 86, wherein said predetermined frequency range divided by said predetermined transmission rate is in the range of 1.2 to 1.3.

107. A method, as claimed in claim 86, wherein the correction code comprises an inner code and wherein at least some of the frames include flush bits and wherein the step of decoding comprises the step of decoding by the flush bits.

108. A method, as claimed in claim 107, wherein said inner code defines an inner code rate of substantially 3/8 or 6/8.

109. A method, as claimed in claim 86, wherein the correction code comprises an outer code, wherein at least some of the frame bodies include blocks of the outer code and wherein the blocks including outer code are interleaved.

110. A method, as claimed in claim 109, wherein the interleaved code blocks comprise three or six outer code blocks depending on whether the coding is light or heavy.

111. A method, as claimed in claim 86, wherein the predetermined number of data cells is four.

112. A method, as claimed in claim 86, wherein the frame bodies bear four times K ATM cells and comprises K code words where K=3 or 6.

113. A method of generating radio waves for use in the down link of a processing communication satellite, comprising:

generating said radio waves in one or more beams having one or more forms of polarization and a predetermined form of modulation, a first group of said beams being limited to a single form of said one or more forms of polarization;

generating said radio waves to represent a plurality of frequency bands having a predetermined frequency range and having a predetermined transmission rate definable in megasymbols per second, the ratio of the predetermined frequency range to the predetermined transmission rate being in the range of 1.2 to 1.3;

generating said radio waves to represent serial TDM streams of data frames, at least some of said streams being used with said first group of beams, said data frames comprising a predetermined number of symbols defining frame bodies with trailer symbols and with header symbols defining frame marker symbols for delineating said data frames and for resolving modulation ambiguity, non-repeating frame number symbols indicating frame numbers of said data frames which do not repeat over the expected life of said satellite and frame type symbols indicating different types of said data frames, said frame bodies comprising inner code blocks and outer code blocks wherein said inner code blocks are convolutionally coded and partitioned into two separate independently decodable quadrature components modulated by square-root raised cosine pulse shaping on quaternary phase shift keying; and generating said radio waves to represent a predetermined number of data cells with a predetermined error correction code grouped within said data frames.

114. A method, as claimed in claim 113, wherein said frame type symbols comprise an indicator of the inner code being used in the frame.

115. A method, as claimed in claim 113, wherein the transmission rate of at least some of the bands is 90–100 megasymbols per second.

116. A method, as claimed in claim 113, wherein the frequency range of at least some of the bands is substantially 125 MHz.

117. A method, as claimed in claim 113, wherein said one or more forms of polarization comprise at least two different forms of polarization.

118. A method, as claimed in claim 113, wherein the forms of polarization comprise forms of polarization selected from the group consisting of right hand circular polarization, left hand circular polarization and both right hand and left hand circular polarization.

119. A method, as claimed in claim 113, wherein the one or more beams comprises a plurality of beams suitable for transmission to a plurality of earth locations using at least some of the same carrier frequencies so that the carrier frequencies may be reused spatially by the satellite.

120. A method, as claimed in claim 113, wherein said beams define a cluster configuration in which each cluster includes the predetermined number of bands and each band occupies a different portion of the available spectrum of frequencies.

121. A method, as claimed in claim 120, wherein the predetermined number of bands is four.

122. A method, as claimed in claim 113, wherein the bands have at least two different polarizations.

123. A method, as claimed in claim 113, wherein the inner code blocks and outer code blocks are interleaved.

124. A method, as claimed in claim 113, wherein at least some of the frame bodies bear four times K ATM cells and comprises K code words where K=3 or 6.

125. A method, as claimed in claim 113, wherein said inner code defines an inner code rate of substantially 3/8 or 6/8.

126. A method, as claimed in claim 113, wherein the blocks including outer code comprise three or six outer code blocks depending on whether the coding is light or heavy.

127. A method, as claimed in claim 113, wherein the predetermined number of data cells is four.

128. A method, as claimed in claim 113, wherein the predetermined error correction code comprises Reed-Solomon code.

* * * * *